United States Patent

[11] 3,579,993

| [72] | Inventors | Carole S. Tanner;<br>Remo Tontini, San Diego, Calif. |
|------|-----------|--------|
| [21] | Appl. No. | 847,052 |
| [22] | Filed | Aug. 4, 1969 |
| [45] | Patented | May 25, 1971 |
| [73] | Assignee | Rohr Corporation<br>Chula Vista, San Diego, Calif. |

[54] SOUND SUPPRESSION SYSTEM
2 Claims, 5 Drawing Figs.

[52] U.S. Cl............................................................ 60/262,
  60/264, 60/271, 181/33HC, 181/33HD, 239/127.3
[51] Int. Cl...................................................... F02k 3/04,
  B64d 33/06
[50] Field of Search............................................. 60/262,
  264, 271; 239/127.3, 265.19; 181/33.221, 33.222

[56] References Cited
UNITED STATES PATENTS

| 3,053,340 | 9/1962 | Kutney | 181/33.221 |
| 3,067,968 | 12/1962 | Heppenstall | 181/33.221 |
| 3,084,507 | 4/1963 | Kleinhans | 181/33.221 |
| 3,113,428 | 12/1963 | Colley | 60/262 |
| 3,262,264 | 7/1966 | Gardiner | 181/33.221 |
| 3,296,800 | 1/1967 | Keenan | 60/262 |

FOREIGN PATENTS

| 1,525,355 | 4/1968 | France | 181/33.221 |

*Primary Examiner*—Douglas Hart
*Attorney*—George E. Pearson

ABSTRACT: System includes a nozzle connected to turbine exhaust outlet to confine and direct gas stream. Nozzle is corrugated to form peripherally spaced radially extending lobes to divide gas into small jet streams. Conduit surrounds exhaust outlet and discharges to exterior of nozzle, and fan air flows through passages between lobes to meet gas streams at exit margin of nozzle. Shroud or ejector sleeve defines and surrounds a mixing zone aft of the exit margin. Leading edge of shroud is spaced aft of fan air conduit to provide annular flow path for entry of ambient air to surround and mix with fan air and gas. Shroud is retractable to surround nozzle in spaced relation and prevent dispersion of fan air before mixing in normal cruising flight.

PATENTED MAY 25 1971

3,579,993

INVENTOR.
CAROLE S. TANNER
REMO TONTINI

BY Edwin D. Grant

ATTORNEY

SOUND SUPPRESSION SYSTEM

BACKGROUND OF THE INVENTION

This invention lies in the field of sound suppression of gas turbine or jet engines, which produce reaction thrust by ejecting a high velocity stream of gas from the exhaust nozzle or tail pipe of the gas turbine. One of the problems of airplanes equipped with jet engines on which a great deal of effort has been expended is that the exhaust stream creates a very high level of sound energy or "noise" in a wide range of frequencies, and a portion of this noise reaches the ground from low flying airplanes, as during takeoff and climb, at an energy level which is not acceptable to the public.

The invention is directed to a system in which air is mixed with the exhaust gas to cool it and add mass and to raise the sound frequencies to levels which are more readily attenuated. It is directed particularly to a system of this type applied to a fan-jet engine in which maximum use is made of the fan air in reducing the noise level. While various schemes have been proposed for applying sound suppression systems to fan-jet engines, so far as known none of them has made use of both fan air and ambient air in a manner which will produce the most effective results.

SUMMARY OF THE INVENTION

The present invention provides a very satisfactory solution to the problem with a minimum amount of equipment and with very few moving parts so that the cost of maintenance and repair is nominal. Generally stated, the system includes a nozzle connected to the turbine exhaust outlet to confine and direct the exhaust gas stream. The nozzle may take one of several forms but preferably it is corrugated to form peripherally spaced radially extending lobes which divide the gas into relative small rearwardly directed jet streams.

Conduit means are provided to supply the fan air to the nozzle region and preferably take the form of a single pipe completely surrounding at least the aft portion of the engine and its exhaust outlet. The pipe terminates at about the forward end of the nozzle and the fan air which is discharged flows rearwardly through passages formed between the lobes to meet the gas at the exit margin of the nozzle for mixing all along the junction line which is about twice as great as the margin of a circular tail pipe of the same diameter. Not only is the mixing area greater but the intermingling of the streams results in a much more complete mixing which cools the gas and adds mass, and also raises the frequencies of the noise to higher levels which attenuate more rapidly.

A shroud or ejector sleeve defines and surrounds a mixing zone immediately aft of the exit margin of the nozzle, the shroud being axially long enough to form a mixing chamber for thoroughly mixing the gas and air before they exit to atmosphere. The leading edge of the shroud is substantially coplanar with the exit margin of the nozzle and thus axially spaced from the fan air conduit outlet. This spacing provides an annular flow path for ambient air to enter and surround the mixture of fan air and gas. Thus, additional mass and mixing are introduced to produce the maximum possible sound suppressing effect.

In the preferred form, the shroud is retractable forwardly into stowed position where it is in engagement with the outer wall of the conduit and blocks ingress of ambient air for normal cruising flight. In this position it surrounds the nozzle in spaced relation and serves as an outer boundary for the flow paths between the lobes, thus preventing dispersion of the fan air prior to its arrival at the nozzle exit margin.

BRIEF DESCRIPTION OF THE DRAWINGS

Various other advantages and features of novelty will become apparent as the description proceeds in conjunction with the accompanying drawing, in which.

DESCRIPTION OF PREFERRED EMBODIMENT

Figure 2:
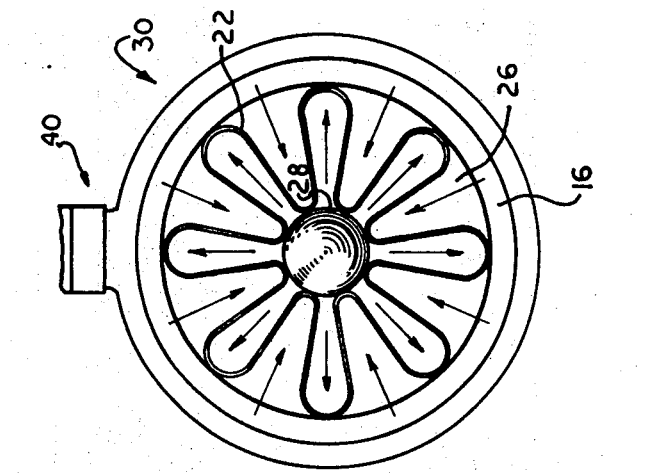
FIG. 2 is a schematic rear elevational view of the engine.
Figure 1:
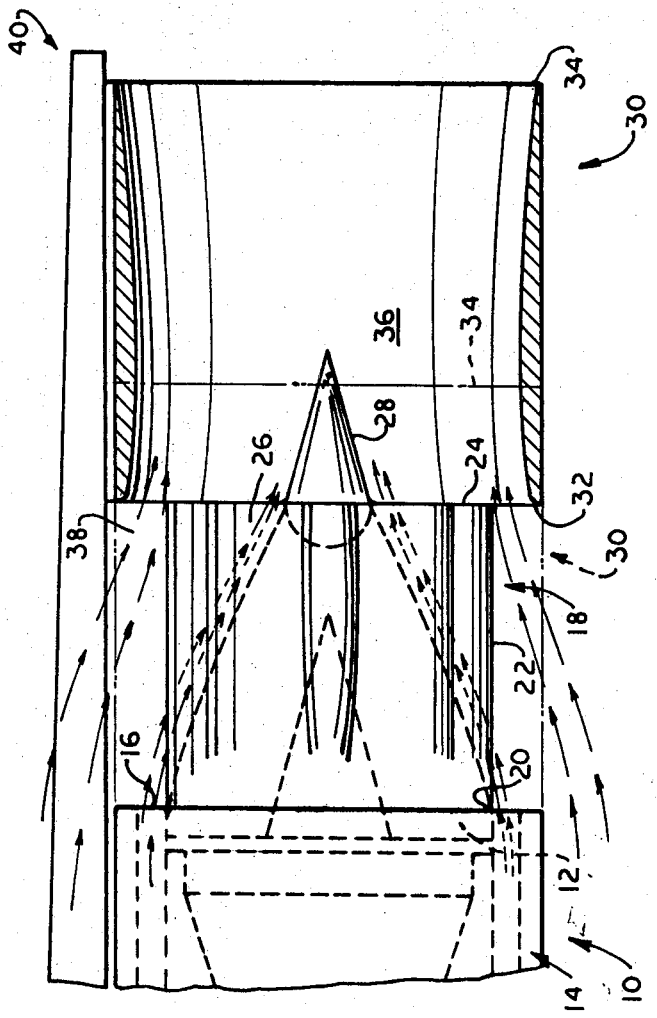
FIG. 1 is a schematic side elevational view, partly in section, of a fan-jet engine incorporating the invention.

The general arrangement of the invention is illustrated in FIG. 1, in which a typical jet engine 10 having an exhaust outlet 12 is circumscribed by a fan air duct or conduit 14 having an outlet 16 substantially coplanar with the engine outlet 12. The primary exhaust nozzle 18 has a circular leading edge 20 and is connected directly to outlet 12 to receive and confine the exhaust gas stream.

Starting adjacent to the leading edge 20, the balance of the nozzle is formed with gradually deepening corrugations defining a plurality of peripherally spaced and radially extending lobes 22. These lobes are open at their aft ends or exit margin 24 to constitute rearwardly directed separate discharge passages for the exhaust gas. They also define between them an equal number of flow passages 26 for fan air, which passages are of maximum depth at the fluted exit margin 24 of the nozzle.

With this construction and arrangement, the total peripheral extent of the exit margin is approximately twice as great as the circumference of the leading edge 20 or a reference circle circumscribing the lobes. Thus the junction line of mixing contact between the gas and the fan air is twice as great as if the nozzle were formed as a cylinder.

In addition, in the preferred form, a streamlined plug 28, coaxial with the engine center line is located with its maximum diameter in the plane of exit margin 24. The plug is about one third of the diameter of the nozzle and the radial extent of each lobe is about two thirds of the radius of the nozzle. The location of the plug tends to force the exhaust gas outwardly and the convergence of the flow passages 26 directs the fan air inwardly in discrete portions. These two factors insure a thorough mixing of the exhaust gas and the fan air.

A generally cylindrical shroud 30, shown in deployed position, has a leading edge 32 and a trailing edge 34 and defines a mixing chamber 36 immediately aft of exit margin 24 to enclose the mixing zone for the gas and fan air. The leading edge 32 is spaced aft of the outlet 16 of conduit 14 substantially coplanar with exit margin 24 and thus defines an annular flow path 38 for ingress of ambient air. This air flows all around the gas and fan air in the mixing zone and adds further mass and cooling to the operation. All three of the elements are mixed thoroughly in the mixing chamber and exit rearwardly therefrom at greatly reduced velocity and noise level, and with the noise frequencies substantially elevated to facilitate attenuation.

The shroud is preferably retractable to the stowed position shown in dotted lines. This is accomplished by mounting the shroud on a pylon 40 which in turn is secured to conduit 14, the shroud being attached to said pylon by means of support mechanisms such as is illustrated and described in U.S. Pat. application Ser. No. 823,029, filed by Remo Tontini on May 8, 1969, and assigned to Rohr Corporation, the assignee of the present application. In the stowed position, the trailing edge 34 may be substantially coplanar with exit margin 24 of some distance to the rear as shown to surround the initial portion of the mixing zone. The leading edge 32 preferably is in sealing engagement with the outer margin of the conduit outlet 16 or the nacelle or other housing surrounding the assembly to block the entrance of ambient air during normal cruising flight. In the stowed position, the shroud surrounds the nozzle in spaced relation and forms an outer boundary for the fan air flow passages, preventing dispersion of the fan air prior to its arrival at the exit margin.

Thus it will be apparent that a system has been devised to take advantage of the availability of fan air in a fan-jet engine by mixing it directly and thoroughly with the turbine exhaust gas in a confined mixing zone to appreciably lower the sound level, and further mixing this gaseous mixture with ambient air in the same confined mixing zone to achieve the maximum practical area of contact for further noise reduction. The improvement has been accomplished with a minimum amount of material and weight and the system functions with complete reliability. In addition to suppressing sound, the ejector or shroud will augment engine thrust by the entrainment of tertiary air. Thrust will be maximum during static conditions, and will gradually diminish during climb due to the drag effects of ram air as velocity increases.

Having thus described the invention, what we claim as new and useful and desired to be secured by U.S. Letters Patent is:

1. A sound suppression system for a fan-jet engine having a turbine exhaust outlet, comprising: a nozzle defining and surrounding a discharge zone immediately aft of the exhaust outlet to confine the exhaust gas stream during the initial stage of its aft travel; said nozzle being corrugated to define a plurality of peripherally spaced, radially extending lobes having a substantially continuous, generally coplanar exit margin; each lobe constituting a separate rearwardly directed discharge passage for a portion of the exhaust gas stream; each pair of adjacent lobes defining between them an axially directed external flow path for air to be mixed with the separated gas streams aft of said exit margin; conduit means to supply fan air to each of said flow paths, and a generally cylindrical shroud surrounding and spaced outwardly from the nozzle, said shroud having a leading edge and a trailing edge and being movable between a first, stowed position in which said leading edge is substantially coplanar with the forward end of said nozzle and arranged to prevent the ingress of ambient air, and said trailing edge is in the vicinity of said exit margin to define an outer boundary for said flow paths and prevent dispersion of said fan air prior to arrival at said exit margin; and a second, deployed position in which said leading edge is substantially coplanar with said exit margin to provide a flow path for the entrance of ambient air to surround said fan air and exhaust gas mix therewith, the length of said shroud between its leading and trailing edges being sufficient to provide a mixing chamber for said air and gas.

2. A sound suppression system for fan-jet engine having a turbine exhaust outlet, comprising: a nozzle defining and surrounding a discharge zone immediately aft of the exhaust outlet to confine the exhaust gas stream during the initial stage of its aft travel; said nozzle being corrugated to define a plurality of peripherally spaced, radially extending lobes having a substantially continuous exit margin; each lobe constituting a separate, rearwardly directed discharge passage for a portion of the exhaust gas stream, each pair of adjacent lobes defining between them an axially directed external flow path for air to be mixed with the separated gas streams aft of said exit margin, conduit means to supply fan air to each of said flow paths, and a generally cylindrical shroud surrounding the nozzle said shroud having a leading edge and a trailing edge and being movable between a first, stowed position in which said leading edge is in sealing relation with said fan air supply conduit means to prevent the ingress of ambient air, and said trailing edge is in the vicinity of said exit margin to define an outer boundary for said flow paths and prevent dispersion of said fan air prior to arrival at said exit margin, and a second, axially deployed position in which said leading edge is spaced rearwardly from said fan air supply conduit means to provide a flow path therebetween for the ingress of ambient air, and said trailing end projects aft beyond the exit margin a distance sufficient to provide a mixing chamber for said air and exhaust gas.